(12) United States Patent
Sathya

(10) Patent No.: US 9,736,501 B2
(45) Date of Patent: Aug. 15, 2017

(54) SYSTEM AND METHOD AND APPARATUS TO DETECT THE RE-OCCURRENCE OF AN EVENT AND INSERT THE MOST APPROPRIATE EVENT SOUND

(76) Inventor: Vijay Sathya, Karnataka (IN)

( * ) Notice: Subject to any disclaimer, the term of this patent is extended or adjusted under 35 U.S.C. 154(b) by 0 days.

(21) Appl. No.: 13/583,637

(22) PCT Filed: Mar. 9, 2011

(86) PCT No.: PCT/IN2011/000153
§ 371 (c)(1),
(2), (4) Date: Sep. 9, 2012

(87) PCT Pub. No.: WO2011/111065
PCT Pub. Date: Sep. 15, 2011

(65) Prior Publication Data
US 2012/0331015 A1    Dec. 27, 2012

(30) Foreign Application Priority Data
Mar. 9, 2010 (IN) .............................. 606/CHE/2010

(51) Int. Cl.
G06F 17/30 (2006.01)
H04N 21/218 (2011.01)
H04N 21/439 (2011.01)
H04N 21/44 (2011.01)
H04N 21/854 (2011.01)

(52) U.S. Cl.
CPC ... *H04N 21/21805* (2013.01); *G06F 17/3074* (2013.01); *H04N 21/4394* (2013.01); *H04N 21/44008* (2013.01); *H04N 21/854* (2013.01)

(58) Field of Classification Search
CPC ........... G06K 9/00711; H04N 21/4394; H04N 21/44008; G06F 17/3074
USPC ........................................................ 707/805
See application file for complete search history.

(56) References Cited

U.S. PATENT DOCUMENTS

| 6,724,918 B1 | 4/2004 | Yen | |
| 8,125,988 B1 * | 2/2012 | Sullivan | H04L 29/0653 370/389 |
| 8,831,505 B1 * | 9/2014 | Seshadri | G09B 5/06 348/211.11 |
| 2008/0079851 A1 * | 4/2008 | Stanger | H04N 5/067 348/575 |
| 2008/0138029 A1 * | 6/2008 | Xu et al. | 386/46 |
| 2009/0249387 A1 * | 10/2009 | Magdy | G06F 17/30787 725/32 |

(Continued)

FOREIGN PATENT DOCUMENTS

WO   WO 2006009521   1/2006

OTHER PUBLICATIONS

International Search Report for PCT/IN2011/000153.
Publication for PCT/IN2011/000153.

*Primary Examiner* — Heather Herndon
*Assistant Examiner* — Merilyn Nguyen
(74) *Attorney, Agent, or Firm* — Garcia-Zamor IP Law; Ruy M. Garcia-Zamor

(57) ABSTRACT

A system and method and apparatus of enabling the detection of re-occurrence of an event in an audio-video broadcast is herein described. Further a system, method and apparatus to insert the most appropriate s "event sound" is also discussed herein. A apparatus using the methods is also disclosed herein.

11 Claims, 12 Drawing Sheets

(56) References Cited

U.S. PATENT DOCUMENTS

| | | | | |
|---|---|---|---|---|
| 2009/0284601 A1* | 11/2009 | Eledath | ................ | G06K 9/209 |
| | | | | 348/157 |
| 2010/0054696 A1* | 3/2010 | Doser | .................. | G11B 27/10 |
| | | | | 386/201 |
| 2010/0245582 A1* | 9/2010 | Harel | ................ | G08B 13/1672 |
| | | | | 348/159 |
| 2011/0010623 A1* | 1/2011 | Vanslette | ............ | G06F 3/0485 |
| | | | | 715/704 |
| 2013/0336628 A1* | 12/2013 | Lamb | .................... | H04N 9/79 |
| | | | | 386/224 |

* cited by examiner

User manually interrupts and generates and alert

User selects the exact frame for recurrence of events, other subsequent frames are selected automatically

US 9,736,501 B2

SYSTEM AND METHOD AND APPARATUS TO DETECT THE RE-OCCURRENCE OF AN EVENT AND INSERT THE MOST APPROPRIATE EVENT SOUND

CROSS REFERENCE TO RELATED APPLICATION

This application claims priority to the following patent applications:(1) Indian Provisional Patent Application No. 606/CHE/2010 filed on Mar. 9, 2010; and (2) Patent Cooperation Treaty No. PCT/IN2011/000153 filed Mar. 9, 2011; each of the above cited applications is hereby incorporated by reference herein as if fully set forth in its entirety.

FIELD OF INVENTION

The present invention relates to a system and method to detect the re-occurrence of an event and insert the most appropriate sound for the event (hereinafter event-sound).

More particularly the instant invention relates to a system and method to detect the re-occurrence of an event and insert the most appropriate event sound wherein the event is an event that occurs in an audio/video feed.

More particularly the instant relates to a system and method to detect the re-occurrence of an event and insert the most appropriate event sound wherein each frame of the audio/video feed is accompanied by an event timestamp indicating the time of recording the frame/s.

More particularly the instant invention relates to a system and method to detect the re-occurrence of an event and insert the most appropriate event sound wherein each frame of the audio/video feed are not be accompanied by an event timestamp indicating when the frame was recorded for the first time and are accompanied only by a timestamp registered while playing out the feed More particularly the instant invention relates to a system and method to detect the re-occurrence of an event and insert the most appropriate event sound wherein the system has user interrupt means to generate an alert in case there is re-occurrence of an event (replay) in an audio-video broadcast feed.

More particularly the instant invention relates to a system and method to detect the re-occurrence of an event and insert the most appropriate event sound wherein the system automatically detects replay event of the video frames in a broadcast feed.

More particularly the instant invention relates to a system and method to detect the re-occurrence of an event and insert the most appropriate event sound wherein the system enables insertion of the most appropriate sound for the re-occuring event.

More particularly the instant invention relates to a system and method to detect the re-occurrence of an event and insert the most appropriate event sound wherein before inserting the event sound is re-purposed using attributes like change in camera angle (camera view), proximity (Close-up, Long shot etc).

The instant invention also relates to an apparatus to detect the re-occurrence of an event and insert the most appropriate event sound wherein the re-purposing further involves modifying various parameters of the eventsound.

More particularly the instant invention relates to an apparatus to detect the re-occurrence of an event and insert the most appropriate event sound.

BACKGROUND OF THE INVENTION

In the sphere of sport broadcasting, there are times when due to importance of a certain events that occur in the field, they are replayed again for the benefit of viewers. Popularly called action replays, said replays are most often and they are also shown from different camera angles and in slow motion.

Currently the original audio recorded with the replay sequence cannot be replayed with the replay sequence due to the slower speed of the replay video (in case of slow motion) and/or the need to persist with the live audio at the time of playing out the replay sequence. Subsequently eventsounds for the key impact events in the replay sequence are never heard during the action replays.

Another problem is that action replays are played out very quickly after the original events making it very difficult to quickly detect the re-occurrence of the events in a replay sequence to enable insertion of the "actual event sound".

Therefore a need exists for a system and method that enables such a process. If done, this shall improve the viewing experience of the audience considerably.

SUMMARY AND OBJECT OF THE INVENTION

A system and method and apparatus of enabling the detection of re-occurrence of an event in an audio-video broadcast is herein described. Further a system, method and apparatus to insert the most appropriate "event sound" is also discussed herein.

The object of the instant invention is to provide a system and method to detect the re-occurrence of an event and insert the most appropriate sound for the event (hereinafter event-sound).

Yet another object of the instant invention is to provide a system and method to to detect the re-occurrence of an event and insert the most appropriate event sound wherein the event is an event that occurs in an audio/video feed.

More particularly the instant relates to a system and method to detect the re-occurrence of an event and insert the most appropriate event sound wherein each frame of the audio/video feed is accompanied by an event timestamp indicating the time of recording the frame/s.

Yet another object of the instant invention is to provide a system and method to to detect the re-occurrence of an event and insert the most appropriate event sound wherein each frame of the audio/video feed are not accompanied by an event timestamp indicating when the frame was recorded for the first time and are accompanied only by a timestamp registered while playing out the feed.

Yet another object of the instant invention is to provide a system and method to detect the re-occurrence of an event and insert the most appropriate event sound wherein the system has user interrupt means to generate an alert in case there is re-occurrence of an event (replay) in an audio-video broadcast feed.

Yet another object of the instant invention is to provide a system and method to detect the re-occurrence of an event and insert the most appropriate event sound wherein the system automatically detects replay event of the video frames in a broadcast feed.

Yet another object of the instant invention is to provide a system and method to detect the re-occurrence of an event and insert the most appropriate event sound wherein the system enables insertion of the most appropriate sound for an event.

More particularly the instant invention relates to a system and method to detect the re-occurrence of an event and insert the most appropriate event sound wherein before inserting the event sound is re-purposed using attributes like change in camera angle (camera view), proximity (Close-up, Long shot etc).

Yet another object of the instant invention is to provide a system and method to detect the re-occurrence of an event and insert the most appropriate event sound wherein the repuposing further involves modifying various parameters of the eventsound.

Yet another object of the instant invention is to provide a system and method to an apparatus to detect the re-occurrence of an event and insert the most appropriate event sound.

BRIEF DESCRIPTION OF ACCOMPANYING DRAWINGS

The features of this invention together with its objects and advantages thereof may be best understood by reference to the description taken in conjunction with the accompanying drawings and herein.

FIGS. 3 4, 5 and 6 illustrate video frames with timestamps.

Figure 7:
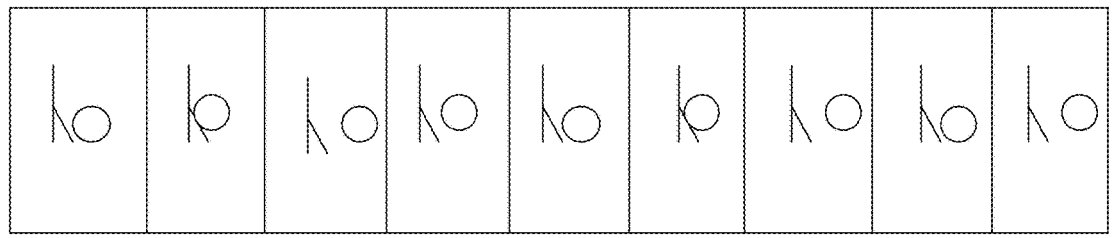
Figure 7:
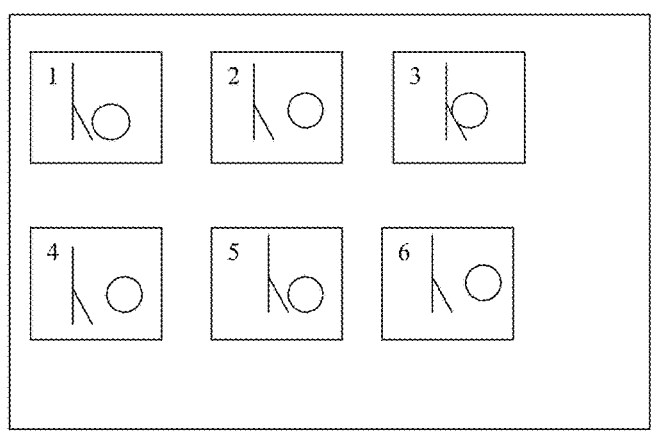
Figure 8:
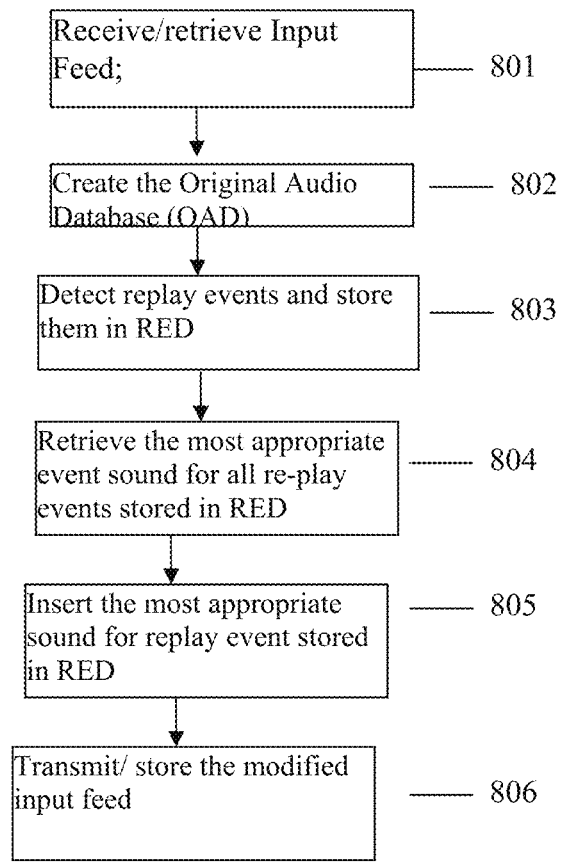
Figure 9:
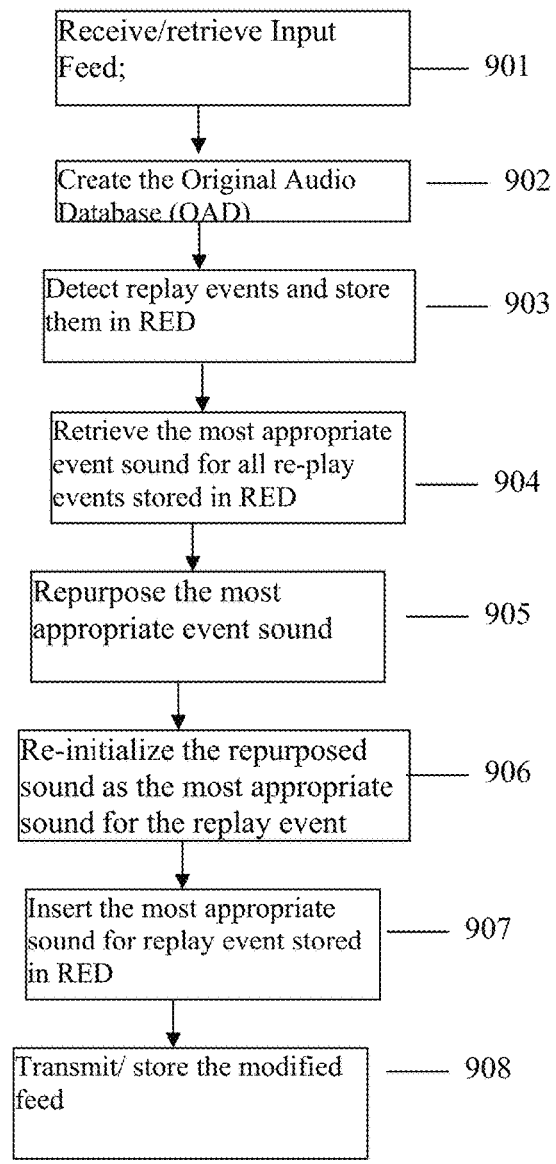
Figure 10:
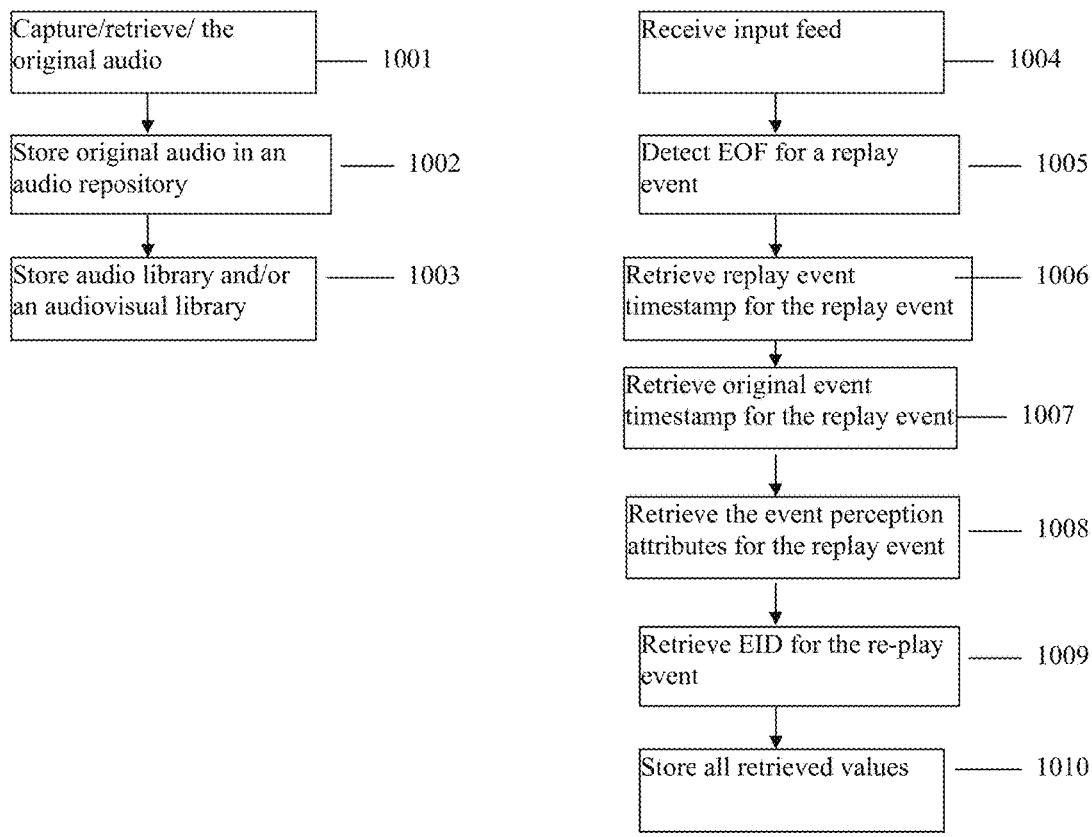
Figure 11:
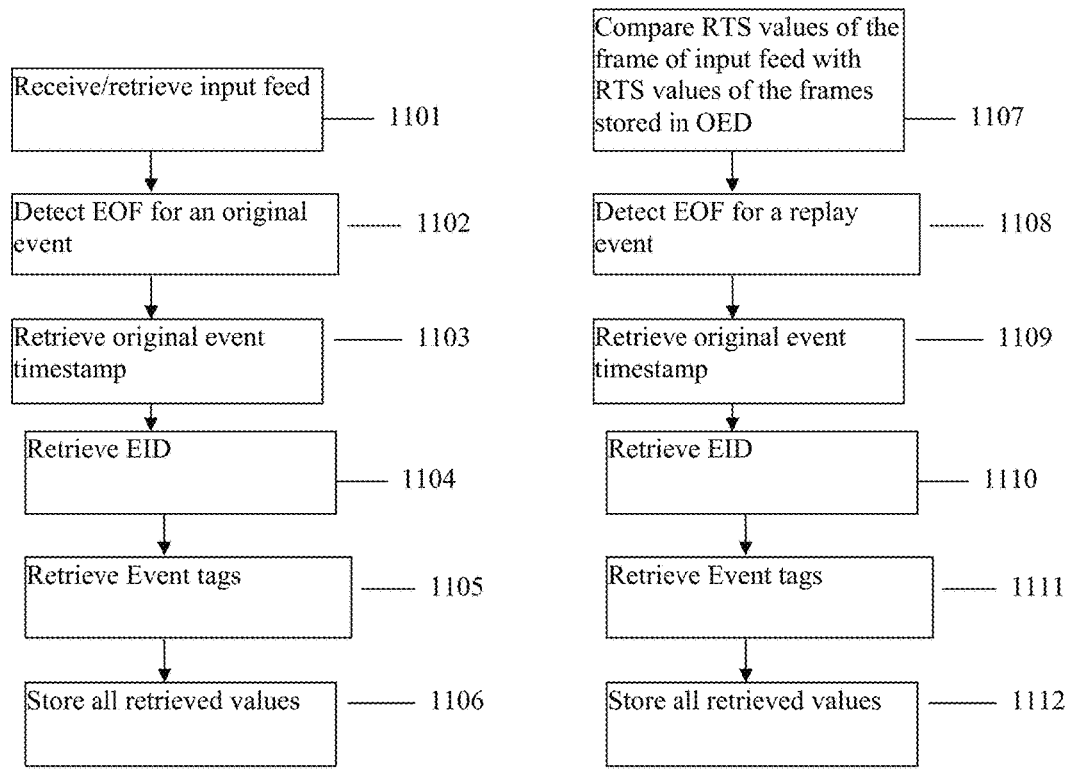
Figure 12:
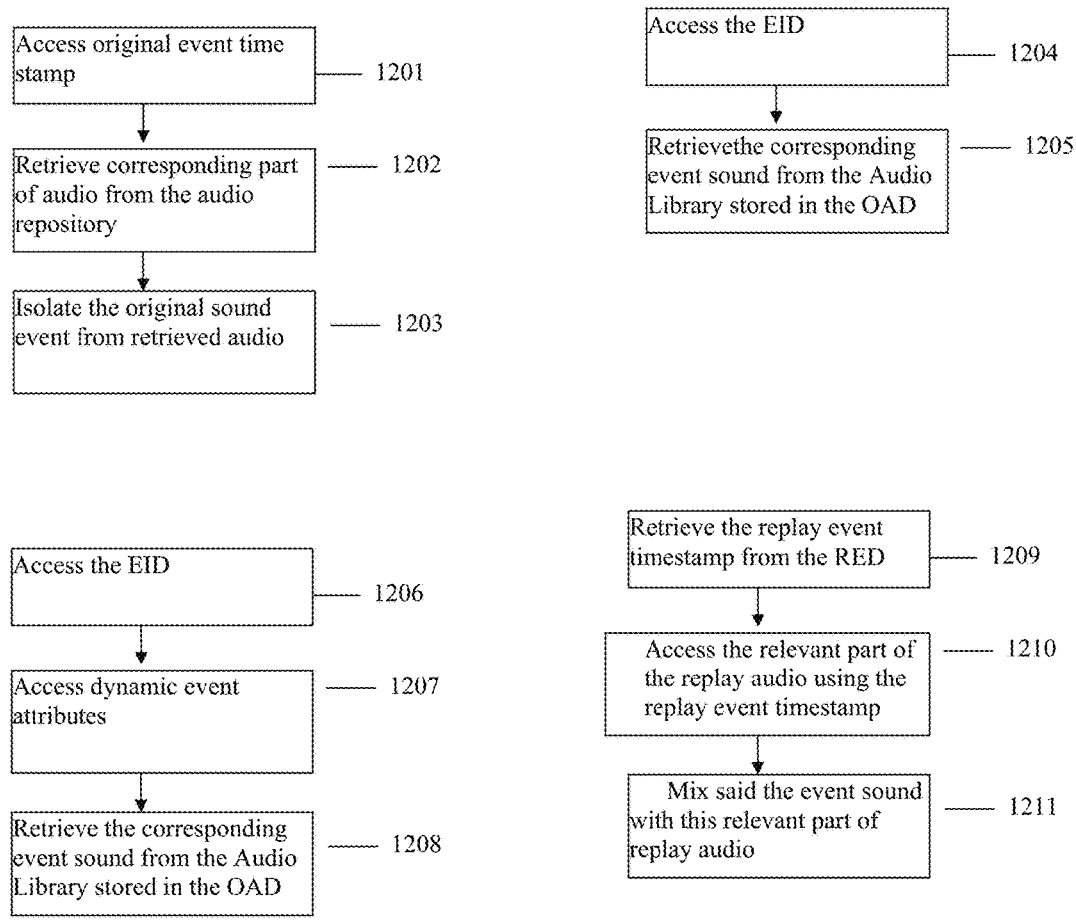

FIG. 7 illustrates the frames without timestamps

FIGS. 8-12 illustrate the methods used in the preferred embodiments.

DESCRIPTION OF THE PREFERRED EMBODIMENT

While describing the preferred embodiments of the instant invention following terms would be used
 Event: A set of AudioVisual frames during an AV transmission wherein something of interest to audiences is said to have occurred and a sound effect or recorded sound from is desired to be audible for audiences to highlight a key action moment.
 Eventsound: Is the desired audible sound for the key action moment defining an event.
 Original Event: The event as it happened originally in transmission, and as shown the first time to audiences.
 Replay Event: the event as played out again (repeated) during transmission after its original occurance and transmission and shown to the audience a second time or thereafter.
 EventActors: the key people or objects featured in the event who are responsible for defining the action moment in the event.
 Feed: Is the generic term used for a live or recorded data of an Audio, Video or Audiovisual stream.
 Original Audio: The Audio feed accompanying out with original event.
 Original Video: The Video feed accompanying the original event.
 Replay Video: The video feed accompanying the replay event
 Replay Audio: The Audio Feed accompanying the replay event
 Original AV: The AudioVisual feed accompanying the original event
 Replay AV: The Audio Visual feed accompanying the replay event
 RTS: Reference Time Stamp is a timestamp that indicates the time at which an Audio and/or Video frame was first captured or any other marker which is able to reference the frame in the same way regardless of when the frame is accessed. In the broadcast industry, an example is the recording time stamp
 GTS: General Time stamp is a time stamp that indicates the time at which the Audio and/or video frame is played out or any other marker which varies based on when the frame in question is accessed. In the broadcast industry an example is the presentation timestamp.
 E-ID: One or more descriptiors describing the event from the standpoint of its characterstics that have a bearing on the eventsound.
 Event-Perception-Attributes: One or more descriptors describing the event from the standpoint of how the vent is perceived by the audience.
 Event-Tags: One or more descriptors describing the event from the standpoint of being able to quickly search and retrieve the event from an event database.

Reference will now be made with reference to the accompanying drawings.

In one of the preferred embodiments of the instant invention as shown in FIGS. 1-12

In the preferred embodiment of the instant invention the system has receiving retrieving means to fetch an input feed. This input feed can either be a live audio-visual stream (A/V) or previously recorded/archived A/V data.

The system is then initialized by creating an OAD (Original Audio database);

The creation of OAD is described as below:

In a preferred embodiment of the instant invention the OAD is creating using creating means. This OAD has the following elements
 An Original Audio Repository containing the original audio along with RTS and/or GTS.
 A media library which may be either one or both of the following:
 A basic Audio Library, featuring a list of Eventsounds stored for different prescribed E-IDs.
 A more advanced AV Library, where different variants of Eventsounds are stored for each of the prescribed E-IDs, along with corresponding video attributes which can be used to map an occurring video instance of the E-ID to the appropriate Eventsound. Patent application WO 2010/134098 A1 explains the working of such an AV library.

Creation of the original Audio Repository is achieved as described below for different cases.

In the case where the system has access to the original audio feed, the original Audio Repository is generated by recording and storing the original audio feed.

In the case where the system has access to the original AV feed, the system extracts the original audio from the original AV feed and stores it. Alternately the whole AV feed may be stored in such way to allow extraction of the original audio later as required by the system.

In both cases, the RTS values are retrieved and stored where available. The GTS values are also retrieved and stored if available and applicable.

One then detects the replay event and stores them in an RED (replay event database);.

The RED contains a list of replay events. Each replay event in the RED entails the following elements:
 Original-event Time stamp, as represented by the original-event-RTS and/or original-event-GTS.
 Replay-event-Timestamp, as represented by the replay-event-RTS and/or Replay-event-GTS
 E-ID
 event-perception-attributes The creation of RED is achieved as described below for different cases featuring feeds with or without RTS values.

In the case where system has access to feeds without RTS, the system uses a combination of the original Video (or original AV), and, the replay video (or replay AV), to create the RED through the following steps:

First, the system uses the original Video (or original AV) to create an Original Event Database (OED). The OED contains a List of detected original events along with their E-ID, Event Tags, and original-event-GTS.

Next, the system uses the replay video (or replay AV) to detect a replay event by manually/automatically locating the event occurred frame (EOF) of the replay event and thereafter noting down the replay-event-GTS.

Next, the system proceeds to retrieve the original -event-GTS for the replay event. To do this, the system maps the replay event with its corresponding original event by comparing it manually/automatically with similar events in the OED. Once a match is found, the original-event-GTS is noted down. To speed up the mapping process, the system allows for event-tags may to be specified while detecting the replay event itself so that these may be compared to the event-tags of the original events stored in the OED.

Next, the system allows to manually/automatically ascertain the E-ID for the replay event by specifying the E-ID while detecting the replay event, or, retrieving from the E-ID of the mapped original event in the OED.

Next, the system allows to manually/automatically specify the event-perception-attributes for the replay event.

And finally, the system stores all these values for the replay event in the RED.

The system then proceeds to use the above described process to detect all instances of replay events in the replay video (or replay AV) and store them in the RED.

In the case where system has access to feeds with RTS, two scenarios can be envisaged. One where both original and replay videos (or AV) are both available, and the other, where only replay video (or AV)

In the scenario where both original video (or Original AV) and replay video (or replay AV and/ or replay Video RTS values) are available, the system creates the RED through the following steps:

First, the system uses the original Video (or original AV) to create an Original Event Database (OED). The OED contains a List of detected original events along with their E-ID, Event Tags, and RTS.

Next, the system detects the replay event automatically by parsing the replay video feed to obtain the RTS of the replay video frames (or using the Replay Video RTS directly as received from another system parsing the replay video) and comparing this RTS with RTS values stored in the OED. Once a match is found, this confirms that an event has re-occurred.

Next, the system ascertains the replay-even-RTS and original-event-RTS as being the value of the RTS at which the match as described in the above step was found.

Next, the system retrieves the E-ID for the replay event from the corresponding original event in the OED.

Next, the system allows to manually/automatically specify the event-perception-attributes for the replay event.

And finally, the system stores all these values for the replay event in the RED.

The system then proceeds to use the above described process to detect all instances of replay events in the replay video (in the replay AV) and store them in the RED In the scenario where replay video (or replay AV) are available, the system creates the RED through the following steps:

First, the system uses the replay video (or replay AV) to detect a replay event by manually/automatically locating the EOF of the replay event and thereafter noting down the RTS value as the replay-event-RTS and original-event-RTS Next, the system ascertains the E-ID for the replay event by manually/automatically specifying the E-ID Next, the system allows for the Event Perception Attributes to be specified for the re-play event.

And finally, the system stores all these values for the replay event in the RED.

The system then proceeds to use the above described process to detect all instances of replay events in the replay video and store them in the RED The OED or the Original events Database (OED) contains a list of original events. Each original event entails the following elements:

Original-event Time stamp, as represented by the original-event-RTS and/or original-event-GTS.

E-ID

Event Tags

The creation of OED is achieved as described below.

In the case where system has access to feeds with or without RTS, the system uses the original Video (or original AV) to create the OED through the following steps:

First, the system uses the original video (or original AV) to detect a replay event by manually/automatically locating the EOF of original event and thereafter noting down the original-event-RTS/GTS.

Next, the system allows to manually/automatically ascertain the E-ID for the original event by specifying the E-ID while detecting the original event.

Next, the system allows to manually/automatically specify the event-tags for the original event.

And finally, the system stores all these values for the original event in the OED.

The system then proceeds to use the above described process to detect all instances of original events in the original video (or original AVA) and store them in the RED In some of the preferred embodiments of the instant invention certain processes during the creation of OED and RED may require user interruption.

The system thus in its preferred embodiments of such invention provides a user friendly interface allowing the user to interrupt the process whenever so desired. A few of such instances are mentioned below.

The system manually detects of the EOF for an event (original event or replay event) using a visual interface for displaying the frames where a user may pause the action after an event has occurred and move backward or forward on a frame by frame basis or in multiple frames to arrive at the frame deemed to be the EOF for the event The system also allows for the manual specification of the E-ID and Event Tags for an event (original event or replay event) using a visual interface for displaying the frames and a key board, or touch screen or voice recognition based input interface, or combination thereof, where a user may rapidly specify the E-ID and event-tags after analyzing the nature of the event.

In the preferred embodiments of the instant invention system automatically detects the EOF for an event (original event or replay event) using tracking techniques that are widely employed today to detect moving objects across frames to deduce the frame deemed to be the EOF.

In yet another preferred embodiment the system automatically specifies the E-ID and event-tags for an event (original event or replay event) using using tracking and image processing techniques that are widely employed today to detect moving objects across frames to deduce the E-ID based on the kind of impact and trajectory after impact. The system also employs player tracking and recognition techniques used today to deduce event-tags such as the event actors involved in the event and homography based mapping techniques to specify location related information as part of the event-tags. This is addition to information regarding the exact or approximate time of occurance of the event.

For each replay event registered in the replay events database, the system retrieves the appropriate eventsound from the OAD in the following manner:

From the part of Audio stored in the Audio repository around the RTS/GTS value either directly, or after some post processing, such as loudness model based extraction to better isolate the original event sound from the background audio in the Audio repository Or, From the Audio or AV Library depending on the EID.

For each replay event, the System then inserts the event sound as follows for the different cases In the case where replay audio (or replay AV) is available the system proceeds to insert the event sound in the replay audio (or replay AV) through the following steps First, the system retrieves the replay-event-timestamp (RTS or GTS) for the replay event from the RED Next, the system proceeds to access the relevant part of the replay audio in the replay audio (or replay AV) using the replay-event-timestamp.

Finally, the system mixes the event sound for the replay event with this relevant part of replay audio in the replay audio (or replay AV) before storing the modified replay audio (or replay AV) for later retrieval or instantaneous playout.

In the case where the replay audio (or replay AV) is not available to system for insertion and/or if required otherwise, the system sends the eventsound onward directly to an Audio mixer.

Prior to inserting the event sound, the System may optionally further re-purpose the event sound. This repurposing is an important step as the replay event may be shown at a completely different perception than the original event and therefore the eventsound needs to be adapted. The system allows for the following adaptations:

Volume adjustments based on the specified event-perception attrinutes such as proximity and intensity of event impact.

Equalisation adjustements based on the nature of eventsound and the replay Audio.

The system allows the user to specify the event-perception attributes either manually or through automatic image processing means. For instance, the system allows the user to specify the proximity of the event using a user defined scale (close, long etc), or based on a generic proximity value attributed to the camera whose feed is the source of the replay event, or a more mathematically accurate proximity scale such as the "Event Relative size" metric defined and used in patent application WO 2011/007330 A2

Action replays, either in normal motion or slow motion are aired almost instantly after the occurance of an event, typically within 5 to 6 seconds of an actual event occurring. Said action replays often feature a sequence of replay events as part of the action replay.

The system in its preferred embodiment is capable of detecting each of all the the replay events in the sequence, and inserting the most appropriate eventsound well within this short delay thus enabling a "near real-time" insertion of the most appropriate sound for the replay events.

We now try to explain the application of the instant invention in a live A/V broadcast of a football match where all feeds contain the RTS.

Figure 1:
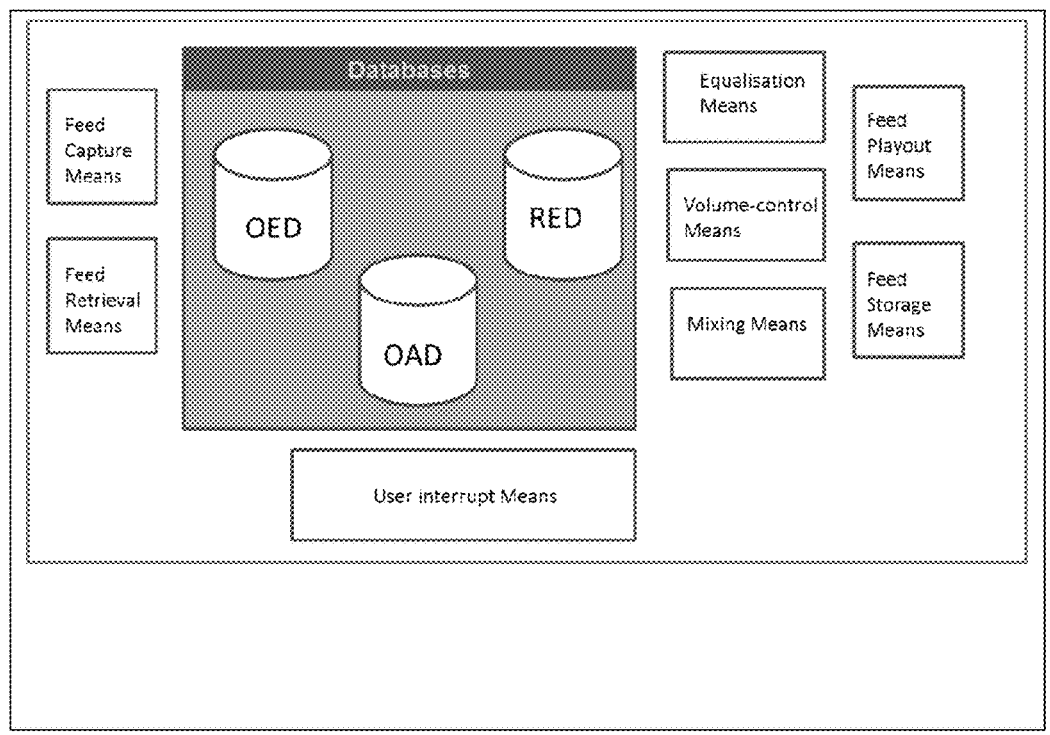
FIG. 1 illustrates the system in its preferred embodiments.
Figure 2:
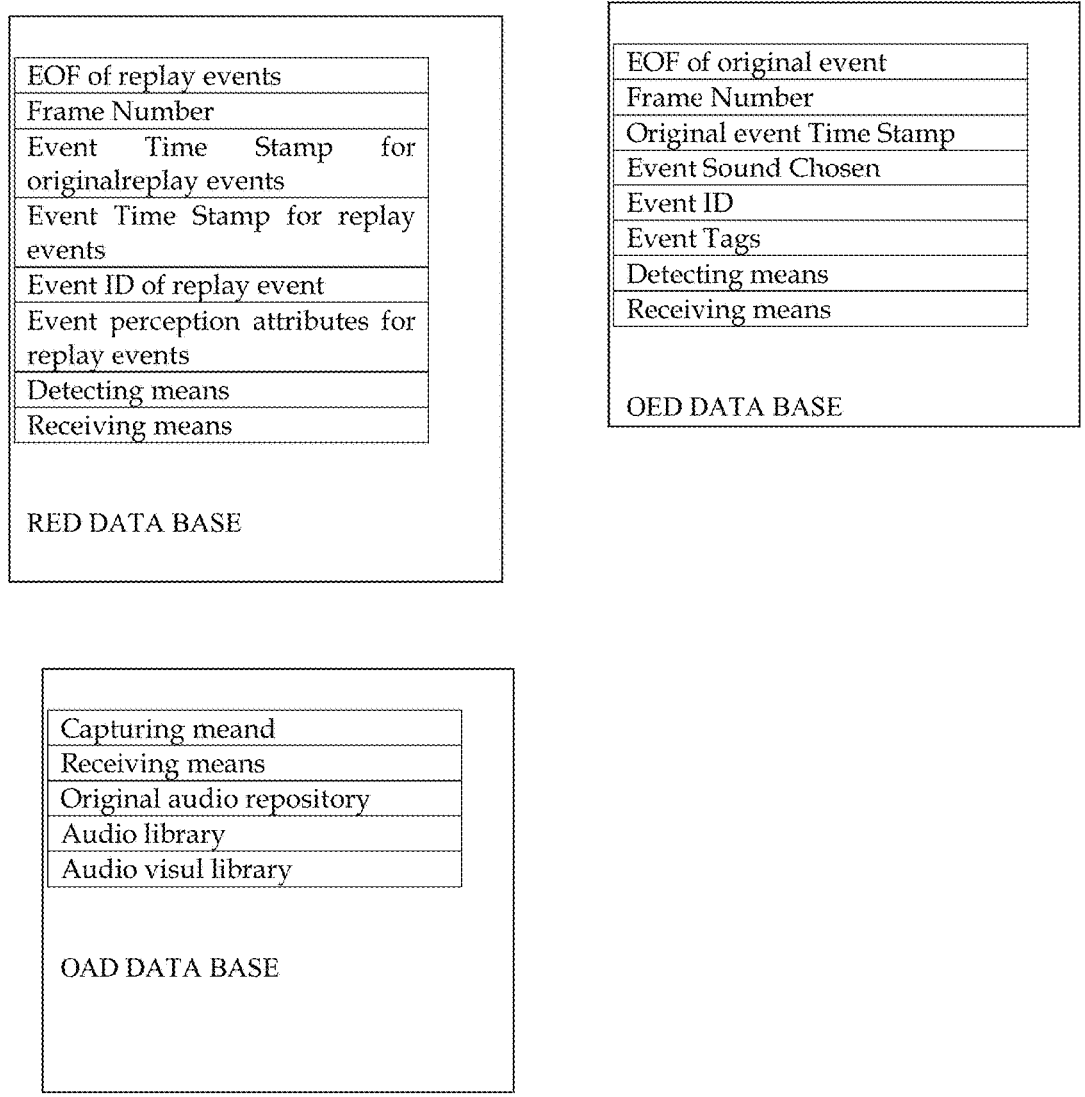
FIG. 2 illustrate the RED, OED and OED databases.
Figure 3:
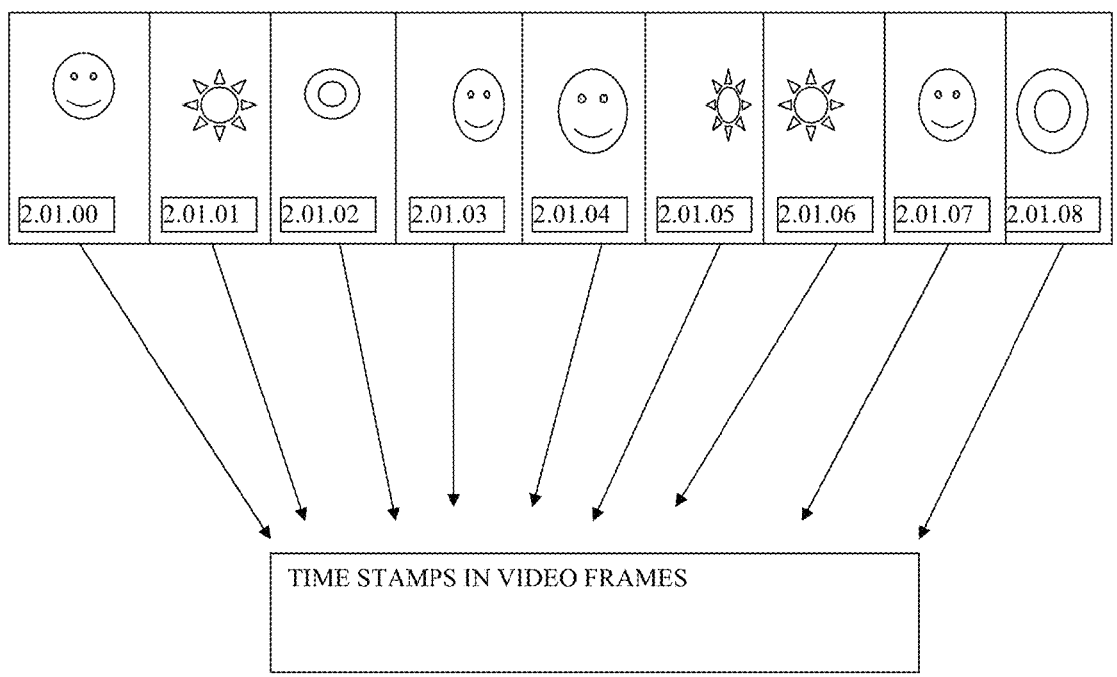
Figure 4:
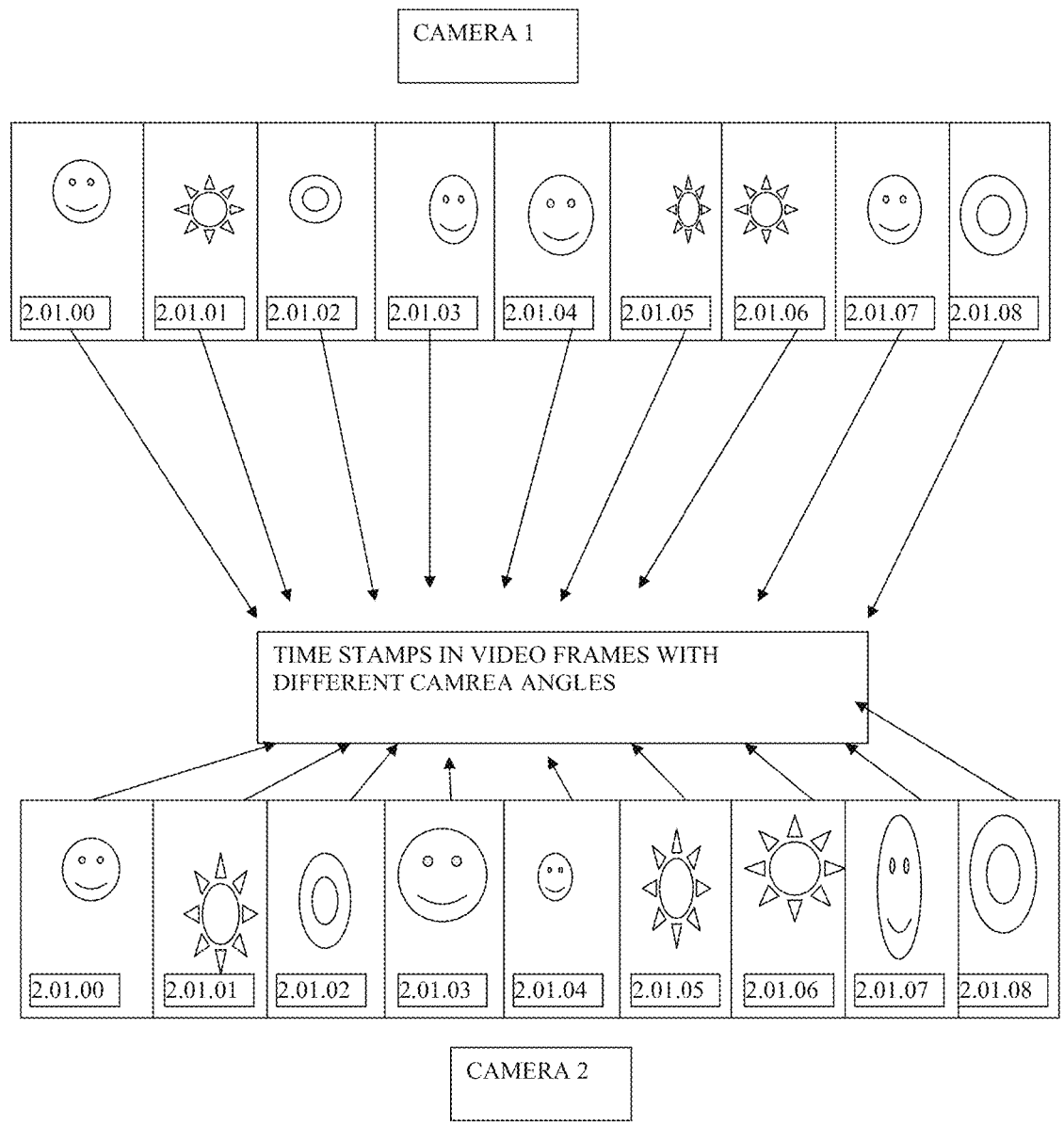
Figure 5:
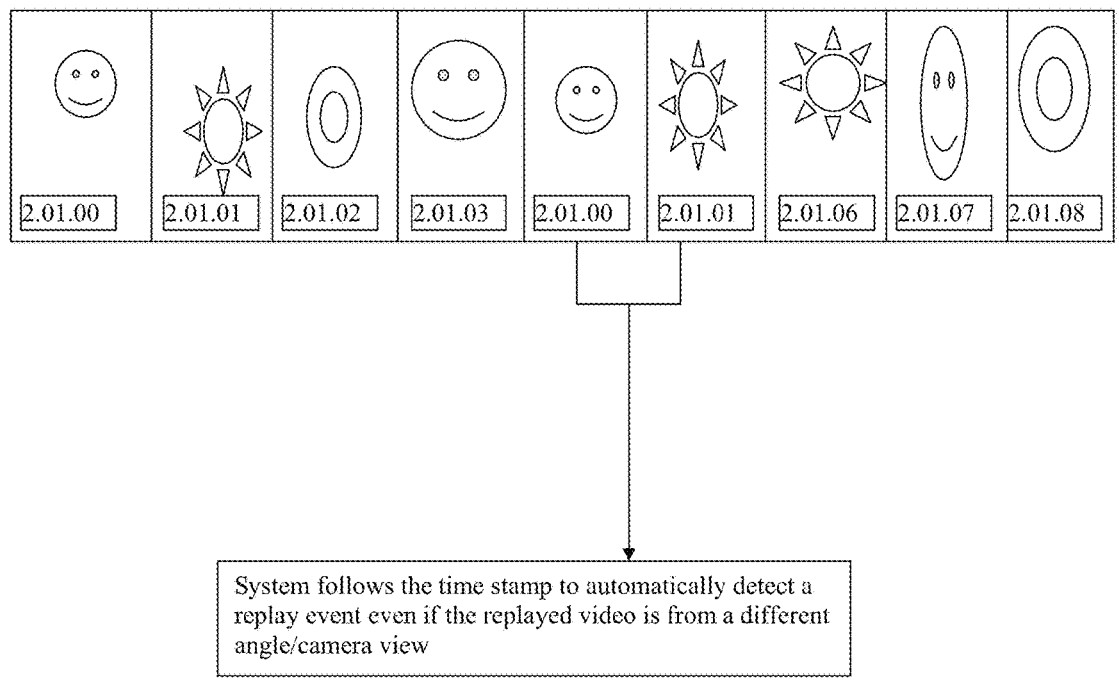
Figure 6:
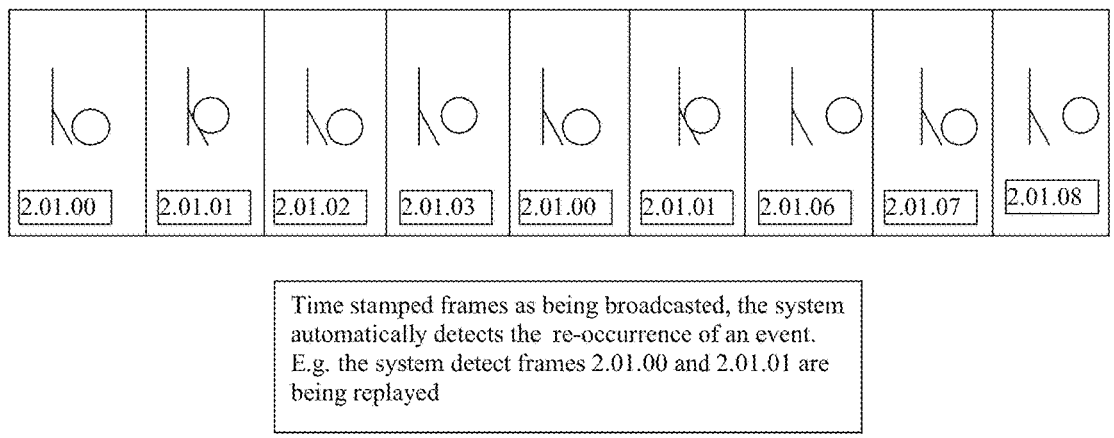

As depicted in FIG. 1 on a normal broadcasting scenario audio/video feeds from different cameras are constantly picked up and fed to a mixer and from where a single output is forwarded as broadcasted data (input feed). The System in its preferred embodiment is placed such that it has access to all the required feeds.

As such the system uses its audio recording means to capture and store the original audio (i.e. all the live Audio Feeds from the Field Mic Audio, along with the Field Audio Mix, Ambience Audio Mix, and Final Audio Mix.) as they are broadcast. These Audio feeds are stored as separate tracks along with their RTS (Recording Time stamps) available in the Audio Repository and as part of the system's OAD. A high end AV library is also stored as part of the OAD.

An interesting event happens featuring a pass, and a dribble and a kick resulting in the scoring of a goal. This key action sequence is recorded from a close up camera to create the replay video. The replay video is accessed by the system and the replay events in that sequence i.e., the pass the dribble and the final kick resulting in a goal are detected and stored in the RED.

When the replay sequence is played out with the replay audio, the most appropriate eventsounds for the replay events are extracted from the OAD. The pass and the kick have been recorded by the field mics and are thereby present in the Audio Repository. So the system extracts the eventsounds for the pass and kick from the OAD. However the dribble has not been captured in the Audio repository. The system therefore retrieves the eventsound from the AV library using the E-ID stored for the replay event. The system further repurposes the extracted evensounds to increase the volume for the close up visuals shown in the replay, and they are sent directly to the final audio mixer or mixed with the replay audio. It thus creates a modified feed which is passed as the new feed which is either broadcasted or saved for later use.

The end user sitting in his/her home watching Live football match gets to experience eventsounds in replays™ which would be a really good experience.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention. The instant invention can accordingly be modified to accommodate such requests.

The invention claimed is:

1. Method enabling detection of a replay event and mixing an event sound therewith, comprising steps of:
   at least one of receiving and retrieving an input feed;
   providing an original audio database, the original audio database containing audio from at least one of an original audio from the input feed and an audio library;
   detecting the replay event in the input feed;
   determining an event occurred frame for the replay event;
   retrieving a replay-event timestamp for the replay event;

retrieving an original-event timestamp for the replay event;

retrieving an event descriptor which describes the replay event characteristics corresponding to the event sound for the replay event;

storing a replay event video, the replay-event timestamp, the original-event timestamp, and the event dscriptor in a replay event database;

retrieving from the original audio database the event sound for the replay event stored in the replay event database;

modifying an audio attribute of the event sound, wherein the audio attribute is at least one of a volume and an equalization;

after modifying the event sound, mixing the event sound for the replay event with an original audio component of the replay event video, wherein a first length of time of the event sound is shorter than a second length of time of the original audio component; and, at least one of transmitting and storing a modified input feed which includes the event sound properly synchronized with the replay event such that the modified input feed is different than the original audio component of the replay event.

2. Method as claimed in claim 1 wherein the method further comprises step of retrieving an event-perception-attributes for the replay event.

3. Method as claimed in claim 2 wherein a event-perception-attributes are specified by a user.

4. Method as claimed in claim 1 wherein the step of determining the event occurred frame of the replay event further comprises steps of comparing a reference time stamp value of the input feed with a reference time stamp value of original events stored in an original events database and, determining the reference time stamp value that matches in the input feed and the original events and, identifying a frame of the input feed with the matched reference time stamp value as the event occurred frame of the replay event.

5. Method as claimed in claim 1 wherein the replay-event timestamp includes replay reference time stamps and replay GTS.

6. Method as claimed in claim 1 wherein the replay-event timestamp is retrieved from the event occurred frame of the replay event.

7. Method as claimed in claim 1 wherein the event descriptor which describes the replay event characteristics corresponding to the event sound is retrieved by retrieving the event descriptor which describes the replay event characteristics corresponding to the event sound from an original event in an original events database.

8. Method enabling detection of a replay event and mixing an event sound therewith, comprising steps of:

at least one of receiving and retrieving an input feed;

providing an original audio database, the original audio database containing audio from at least one of an original audio from the input feed and an audio library;

detecting the replay event and storing a replay event video in a replay event database;

retrieving from the original audio database the event sound for the replay event stored in the replay event database;

modifying an audio attribute of the event sound, wherein the audio attribute is at least one of a volume and an equalization;

mixing the event sound for the replay event with an original audio component of the replay event video, wherein a first length of time of the event sound is shorter than a second length of time of the original audio component;

at least one of transmitting and storing a modified input feed which includes the event sound properly synchronized with the replay event such that the modified input feed is different than the original audio component of the replay event video;

repurposing the event sound retrieved for a replay event;

re-initialising the repurposed event sound as the most appropriate event sound for the replay event, wherein the method of repurposing the event sound retrieved from the original audio database comprises steps of:

adjusting final mixing volume based on event perception attributes;

adjusting final equalizer settings for mixing based on the event sound and nature of replay audio and creating the repurposed event sound.

9. Method as claim claimed in claim 1 wherein the step of determining the event occurred frame of a replay event is achieved using an interface enabling user interrupt.

10. Method as claimed in claim 1 wherein the original-event timestamp includes original reference time stamps and original general time stamps.

11. Method as claimed in claim 1 wherein the event descriptor which describes the replay event characteristics corresponding to the event sound is specified by a user.

\* \* \* \* \*